(12) United States Patent
Saeki et al.

(10) Patent No.: US 10,386,579 B2
(45) Date of Patent: Aug. 20, 2019

(54) OPTICAL TRANSMITTING MODULE AND MULTI-LANE TRANSMITTER OPTICAL MODULE

(71) Applicant: Sumitomo Electric Industries, Ltd., Osaka-shi (JP)

(72) Inventors: Tomoya Saeki, Yokohama (JP); Munetaka Kurokawa, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/523,082

(22) PCT Filed: Oct. 27, 2015

(86) PCT No.: PCT/JP2015/080238
§ 371 (c)(1),
(2) Date: Apr. 28, 2017

(87) PCT Pub. No.: WO2016/068130
PCT Pub. Date: May 6, 2016

(65) Prior Publication Data
US 2017/0322381 A1  Nov. 9, 2017

(30) Foreign Application Priority Data
Oct. 31, 2014  (JP) ................. 2014-222991

(51) Int. Cl.
*G02B 6/42*  (2006.01)
*G02B 6/32*  (2006.01)
(Continued)

(52) U.S. Cl.
CPC ............... *G02B 6/32* (2013.01); *G02B 6/27* (2013.01); *G02B 6/2938* (2013.01);
(Continued)

(58) Field of Classification Search
CPC ......... G02B 6/2938; G02B 6/32; G02B 6/421
See application file for complete search history.

(56) References Cited

U.S. PATENT DOCUMENTS 4,753,508 A * 6/1988 Meuleman ............... G02B 6/32
250/227.24
4,942,623 A * 7/1990 Asawa .................... G02B 6/24
380/54
(Continued)

FOREIGN PATENT DOCUMENTS

CN  105093436 A  11/2015
JP  H01-200207 A  8/1989
(Continued)

*Primary Examiner* — Daniel Petkovsek
(74) *Attorney, Agent, or Firm* — Baker Botts LLP; Michael A. Sartori (57) ABSTRACT

A transmitter optical module that provides an LD, a first lens with a focal point aligned with an optical output point of the LD, a second lens that generates an optical output of the first lens as a concentrated optical signal, and a third lens that provides an optical output of the second lens in an optical fiber. The second lens is set at a position offset toward the third lens from a position at which the second lens outputs a collimated optical signal. The third lens concentrates an optical output thereof within the optical fiber.

4 Claims, 10 Drawing Sheets

(51) Int. Cl.
*G02B 6/27* (2006.01)
*G02B 6/293* (2006.01)

(52) U.S. Cl.
CPC ......... *G02B 6/4201* (2013.01); *G02B 6/4206* (2013.01); *G02B 6/421* (2013.01)

(56) References Cited

U.S. PATENT DOCUMENTS

| | | | | |
|---|---|---|---|---|
| 6,775,068 | B2* | 8/2004 | Lomas | G02B 6/266 359/619 |
| 7,184,621 | B1* | 2/2007 | Zhu | G02B 6/29361 385/24 |
| 8,254,023 | B2* | 8/2012 | Watson | G02B 21/002 359/368 |
| 8,625,989 | B2* | 1/2014 | Du | G02B 6/4215 398/43 |
| 9,008,474 | B2* | 4/2015 | Nakanishi | G02B 6/4206 385/33 |
| 9,490,900 | B2* | 11/2016 | Saeki | H04B 10/503 |
| 9,638,861 | B2* | 5/2017 | Maruyama | G02B 6/32 |
| 9,780,882 | B2* | 10/2017 | Saeki | G02B 6/42 |
| 10,209,458 | B2* | 2/2019 | Kurashima | G02B 6/327 |
| 2004/0114883 | A1* | 6/2004 | Furuichi | G02B 6/4206 385/93 |
| 2005/0105862 | A1 | 5/2005 | Sung et al. | |
| 2009/0220233 | A1* | 9/2009 | Presley | G02B 6/3518 398/79 |
| 2009/0274421 | A1 | 11/2009 | Arayama et al. | |
| 2012/0051084 | A1* | 3/2012 | Yalin | G02B 6/028 362/553 |
| 2013/0148966 | A1* | 6/2013 | Kurokawa | H04J 14/02 398/65 |
| 2014/0215816 | A1 | 8/2014 | Kurokawa et al. | |

FOREIGN PATENT DOCUMENTS

| | | |
|---|---|---|
| JP | H03-149510 A | 6/1991 |
| JP | H04-060506 A | 2/1992 |
| JP | 2007-017580 A | 1/2007 |
| JP | 2007-212795 A | 8/2007 |
| JP | 2014-149494 A | 8/2014 |

* cited by examiner

OPTICAL TRANSMITTING MODULE AND MULTI-LANE TRANSMITTER OPTICAL MODULE

TECHNICAL FIELD

The present invention relates to a transmitter optical module and a multi-channel transmitter optical module.

BACKGROUND ART

A prior patent document of Japanese Patent Application laid open No. JP2008-212795A has disclosed an optical semiconductor module. The optical semiconductor module disclosed therein includes a semiconductor laser diode that emits laser beam, a concentrating lens that concentrates the laser beam emitted from the semiconductor laser diode, and an optical connector that outputs the laser beam concentrated by the concentrating lens in a transmission line secured by a fiber ferrule. The optical connector includes the fiber ferrule that provides an optical fiber having an incident surface through which the laser beam enters and an optical attenuating portion that covers the incident surface. The optical attenuating portion may be a polarization glass. The optical attenuating portion has transmittance for the laser beam depending on a rotational position thereof. Also, the semiconductor laser diode, the concentrating lens, and the optical connector are optically aligned such that the laser beam projected on the incident surface in a spot size thereof shows a diameter smaller than a diameter of a core of the optical fiber.

In a transmitter optical module, even when the semiconductor laser diode (hereinafter denoted as LD), the concentrating lens, and the optical fiber are adequately aligned to each other, an optical power of the LD operating under a preset bias current, namely, the optical power externally output from the module and coupled to a lens, sometimes exceeds a preset power. Reducing the bias current to set the optical power in the preset power, the LD in a resonance frequency thereof also lowers to degrade high frequency performance thereof.

Accordingly, as disclosed in the prior patent document, sliding the optical connector along the Z-axis, along an optical axis, which offsets the incident surface of the optical fiber from a focal point of the concentrating lens, a portion of the laser beam entering the core of the optical fiber relatively decrease, which is often called as a defocus.

A transmitter optical module that implements a plurality of LDs multiplexes optical signals output from the LDs onto an end surface of a unique optical fiber. The defocus described above may optionally adjust the optical power coupled with the unique optical fiber only for one of the LDs. However, for instance, when the transmitter optical module is necessary to adjust the optical power for four LDs, a subject is left that scattering in the optical coupling efficiency of components for multiplexing the optical output power of the respective LDs or for wavelength-multiplexing the laser beam of the respective LDs increases.

Because four laser beams are coupled on the end surface of the optical fiber through the unique concentrating lens, when the defocus adjusts the optical power for only one of LDs, the laser beams of the rest of the LDs are not always adequately adjusted. That is, optical axes of the LDs each directing the concentrating lens ideally align with the optical axis of the concentrating lens; but they are practically misaligned in respective LDs. Accordingly, even when the end surface of the optical fiber is shifted along the optical axis of the concentrating lens, the laser beams of the LDs do not always enter the end surface along the optical axis of the concentrating lens. Also, optical defocus amounts are often different from respective LDs, the LDs are not always defocused in respective optimum amount.

The present invention, based on the subjects above described, is to provide an transmitter optical module and a multi-lane transmitter optical module showing stable optical output power.

SUMMARY OF INVENTION

A transmitter optical module according to embodiment of the present invention comprises a transmitting optical device, a first lens that has a focal point aligned with an optical output point of the transmitting optical device, a second lens that outputs an optical output of the first lens as a concentrated beam, and a third lens that couples concentrated optical beam with an optical fiber. The second lens is set at a position closer to the third lens from another position at which the second lens outputs the optical output of the first lens as a collimated optical beam, and the third lens concentrates the concentrated optical signal within the optical fiber.

A multi-channel transmitter optical module according to embodiment of the present invention including a plurality of signal lanes each including a light-emitting element, a first lens, and a second lens comprises a third lens that couples optical signals with an optical fiber, the optical signal being output from the second lanes in the respective signal lanes and multiplexed to each other. In the respective signal lanes, the first lens has a focal point aligned with an optical output point of the light-emitting element, and the second lens is set in a position at which the second lens converts an optical output of the first lens into a concentrated beam. The concentrated beam output from the second lens is concentrated within the optical fiber.

Advantage of Invention

In an transmitter optical module and a multi-lane transmitter optical module according to an embodiment of the present invention may show stable optical output power.

DESCRIPTION OF EMBODIMENTS

Next, some preferred embodiments according to the present invention will be described as referring to drawings. In the description of the drawings, numerals or symbols same with or similar to each other will refer to elements same with or similar to each other without duplicated explanations.

First Embodiment

Figure 1:
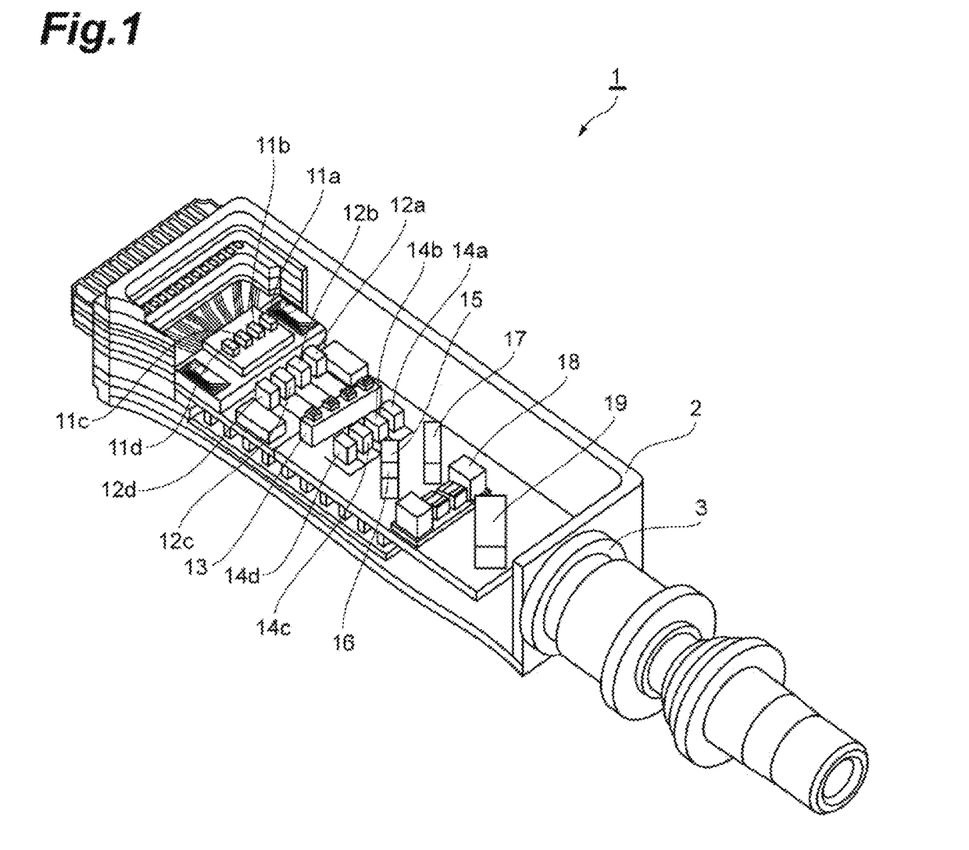
FIG. 1 is a perspective view showing an inside of a transmitter optical module according to the first embodiment of the present invention.
Figure 2:
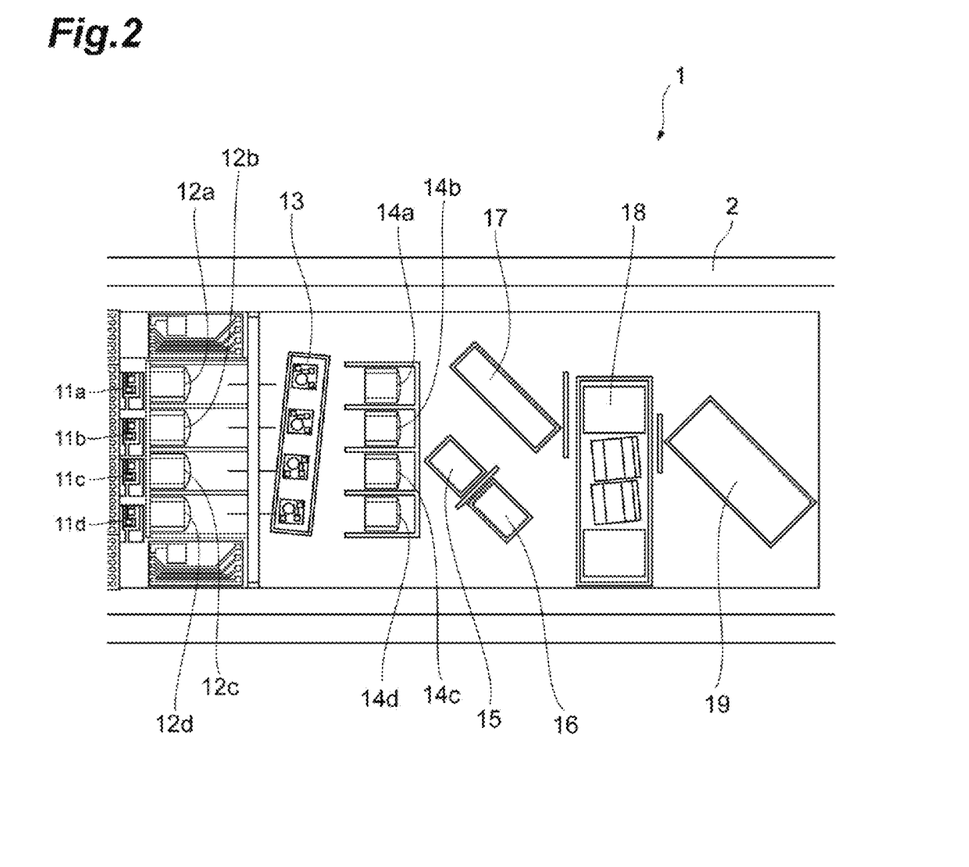
FIG. 2 is a plan view of an inside of the transmitter optical module shown in FIG. 1.

FIG. 1 illustrates an inside of a transmitter optical module 1 according to the present embodiment. FIG. 2 is a plan view of an inside of the transmitter optical module 1. As shown in FIG. 1 and FIG. 2, the transmitter optical module 1 provides a box-shaped housing 2 and an optical coupling portion 3 of a cylindrical shape with a flange. The transmitter optical module 1 installs four LDs (light-emitting element) 11a to 11d, four first lenses, 12a to 12d, a beam splitter 13, four second lenses, 14a to 14d, a first WDM filter 15, a second WDM filter 16, a mirror 17, an isolator 18, and a polarization composite filter 19. The transmitter optical module 1 is a type of four-channel transmitter optical module implementing four LDs, 11a to 11d, four first lenses, 12a to 12d, and four second lenses, 14a to 14d.

The first lenses, 12a to 12d, correspond to the LDs, 11a to 11d, and the second lenses, 14a to 14d, correspond to the first lenses, 12a to 12d. The description below sometimes denotes the LDs, 11a to 11d, collectively as the LD 11, the first lenses, 12a to 12d, collectively as the first lens 12, also the second lenses, 14a to 14d, collectively as the second lens 14. Thus, the LD 11 indicates at least one of the LDs, 11a to 11d, the first lens 12 indicates at least one of the first lenses, 12a to 12d, and the second lens 14 indicates at least one of the second lenses, 14a to 14d.

Also, although the description of the drawings sometimes refers to terms of "front and rear", the terms are merely presented for explanation sake. In the description below, the "front" corresponds to a side where the LDs, 11a to 11d, are placed viewed from the first lenses, 12a to 12d, and the "rear" corresponds to a side where the optical coupling portion 3 is provided viewed from the housing 2.

In a transmitter optical module 1, the LDs, 11a to 11d, operating as optical sources are independently driven and output respective optical signals. The optical signals output form the LDs, 11a to 11d, enter the first lenses, 12a to 12d. Because the LDs, 11a to 11d, are arranged in respective positions apart from focal points of the first lenses, 12a to 12d; the first lenses, 12a to 12d, operate as respective concentrating lenses for the optical signals.

The optical signals concentrated by the first lenses, 12a to 12d, enter the second lenses, 14a to 14d, and are converted into collimated beams. The second lenses, 14a to 14d, are arranged such that focal points thereof in a side of the LDs, 11a to 11d, align with the focal points of the first lenses, 12a to 12d, in a side of the second lenses, 14a to 14d. Accordingly, the optical beams output from the focal points of the first lenses, 12a to 12d, namely, the focal points of the second lenses, 14a to 14d, may be converted into the collimated beams.

Figure 3:
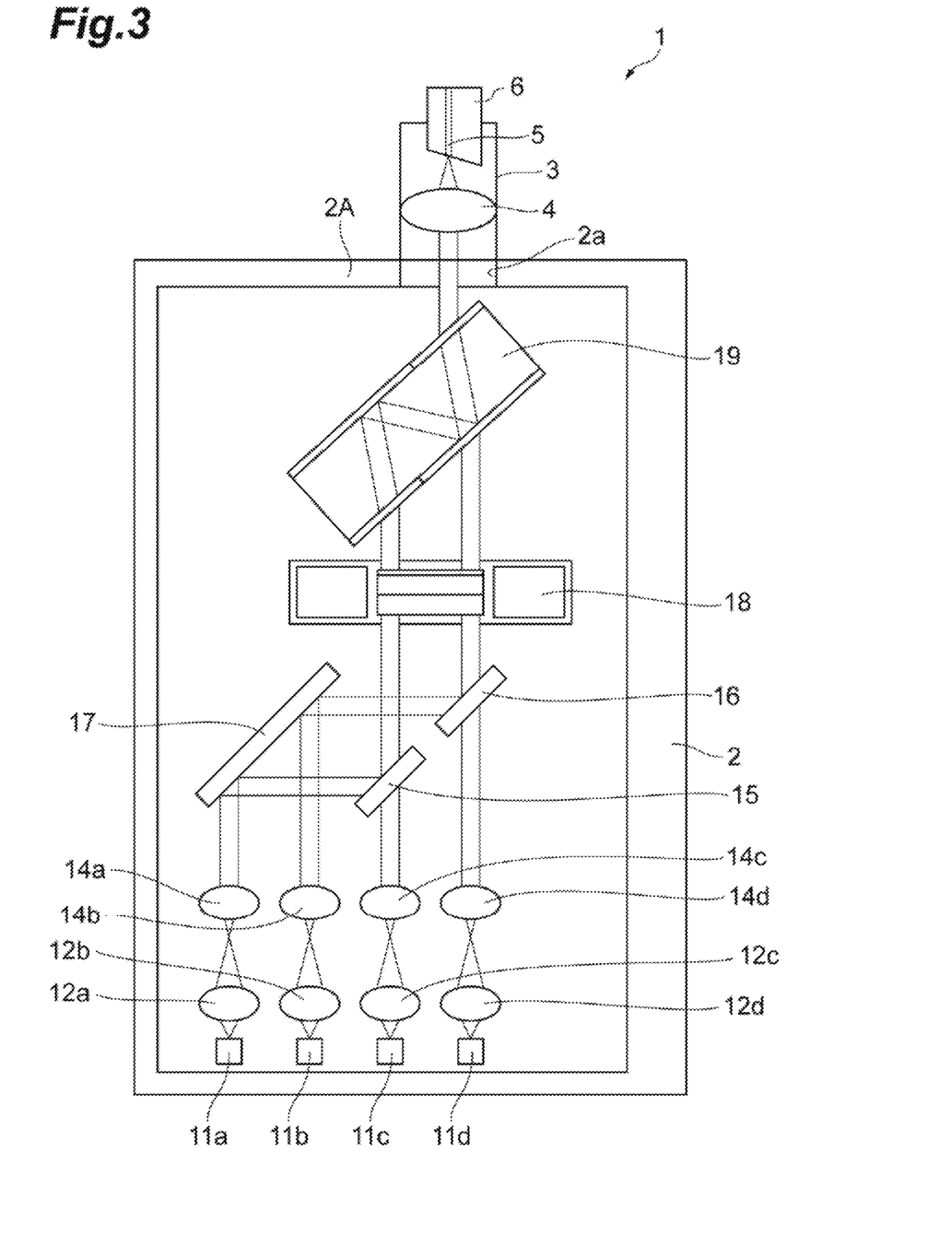
FIG. 3 schematically shows an optical coupling system of the transmitter optical module shown in FIG. 1.

FIG. 3 schematically shows an optical coupling system of the transmitter optical module 1. As shown in FIG. 3, the optical signals passing the second lenses, 14a to 14d, are multiplexed by an optical coupling system including the first WDM filter 15, the second WDM filter 16, the mirror 17, the optical isolator 18 and the polarization composite filter 19; and externally output through a window 2a provided in a rear wall 2A of the housing 2. The optical signal output from the housing 2 couples with the end surface of the optical fiber 5, which is secured by the fiber stub 6, by the third lens 4 provided in the optical coupling portion 3.

Conventionally, the optical power of the optical beam coupled with the end surface of the optical fiber, which is hereafter called as the fiber coupling power, is adjusted by a technique of offsetting the end surface of the fiber along the optical axis (the sleeve defocusing). However, the present embodiment adjusts the fiber coupling power of the respective optical signals by offsetting the second lenses, 14a to 14d, along the optical axis.

The transmitter optical module 1 of the present embodiment converts the optical signals output from the LDs, 11a to 11d, into collimated beams by the second lenses, 14a to 14d, and multiplexes the collimated beams by the optical circuit. The optical signal output from the housing 2 is a collimated beam and concentrated by the third lens 4, which is a concentrating lens, onto an end of the optical fiber 5. When the collimated beam enters the third lens 4 within an effective area thereof, the optical beam could be concentrated on one point even when the optical signals passing the second lenses, 14a to 14d, shift the optical axes thereof. However, the optical coupling efficiency of the optical signals is not always within a preset range. The optical power coupled with the optical fiber 6 depends on the optical output power of the LDs, 11a to 11d, and the optical coupling efficiency of the optical system. Both factors practically show dispersion of about 3 dB.

The LDs, 11a to 11d, having the arrangement of the direct modulation may generally show the optical output power of about 10 dBm in an average. Because the optical system generally shows optical loss of 2 to 3 dB, the average power of the optical signal output from the optical fiber 5 becomes 7 to 8 dBm. On the other hand, maximum optical power is restricted to be 4.5 dBm, which is ruled in a standard of 100 GBASE-LR4. The optical output power of 7 to 8 dBm of the transmitter optical module 1 exceeds the limitation in the standards. Accordingly, the optical output power of the optical module is necessary to be lowered by adjusting the optical coupling efficiency with the optical fiber 5.

A conventional technique to adjust the fiber coupling efficiency shifts a position of the end of an optical fiber closer to or apart from a focal point (focus), which is often called as the de-focus technique, to adjust the optical coupling efficiency. However, applying the de-focus technique to the transmitter optical module 1, it could be possible for the optical axis of only one optical signal, but the rest of the optical signals become impossible to be adjusted in the optical coupling efficiency with the optical fiber because of the scattering of the optical output power of the LDs, 11a to 11d, and that of the optical axes in the optical system. Thus, all of the optical signals are impossible to be adjusted in the optical coupling efficiency thereof.

Figure 8:
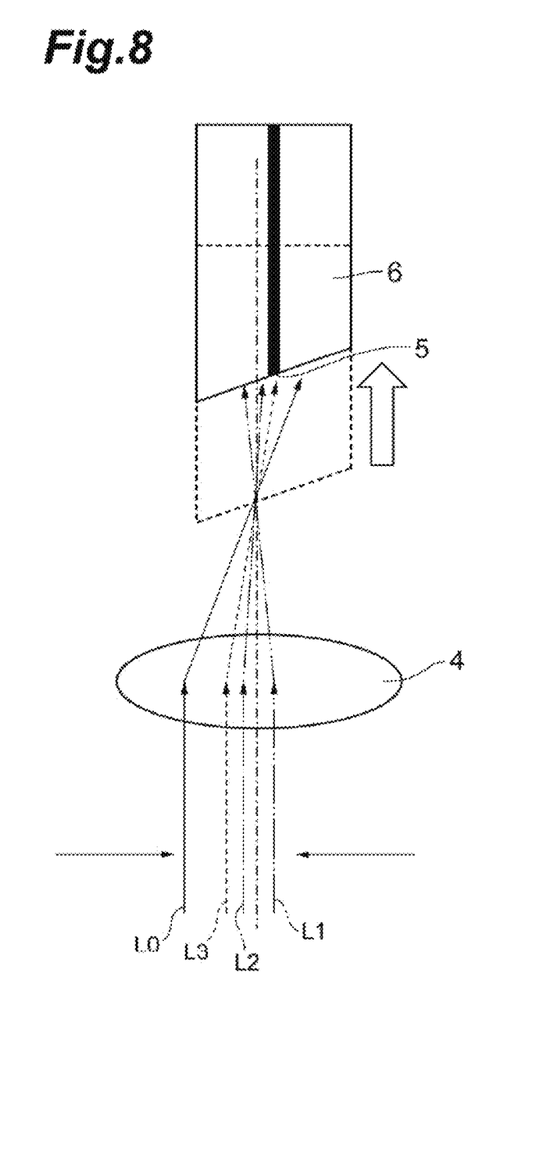
FIG. 8 explains a conventional alignment technique.

Reasons why the optical coupling efficiency with the optical fiber scatters will be further specifically described. As shown in FIG. 8, when four collimated beams, L0 to L3, enter the third lens 4, which is a concentrating lens, and the respective optical axes of the collimated beams, L0 to L3, are offset from the optical axis of the third lens 4, the concentrated optical signals output from the third lens 4 toward the optical fiber 5 show angles different from each other. However, as far as the offsets of the optical axes of the collimated beams, L0 to L3, are within the range of the effective diameter of the third lens 4, the concentrated optical signals from the third lens 4 toward the optical fiber 5 may concentrate onto one point, and substantial coupling efficiency with the optical fiber 5 may be attained.

However, in order to adjust the optical power output from the transmitter optical module 1, shifting the end of the optical fiber 5 closer to or apart from the focal point; respective coupling points on the end of the optical fiber 5 widely scatters because of the respective angles of the optical axes of the concentrated beams. Accordingly, the optical coupling efficiency shows a large difference. Assuming the focal length of the third lens 4 to be f, a relation between an offset $\Delta x$ from the center of the third lens 4 and the concentrating angle $\theta$ becomes: $\Delta x/f=\theta$.

In order to solve the subject above described, relative lengths between the LDs, 11a to 11d, and the second lenses, 14a to 14d, are adjusted until the optical coupling efficiency with the optical fiber becomes within a designed range by shifting the positions of the second lenses, 14a to 14d, along the respective optical axes. Thus, such adjustments may set the optical coupling efficiency within the designed ranged for all LDs, 11a to 11d.

Next, an adjustment of setting the optical coupling efficiency within the designed range will be specifically described. As illustrated in FIG. 3, the transmitter optical module 1 has the optical system having three lenses, where the first lenses, 12a to 12d, concentrate the optical signals output from the LDs, 11a to 11d, by magnification of 5 to 6, which is known as optimum magnification of a lens to couple an optical signal output from a DFB-LD with a single mode fiber (SMF). The third lens 4 set outside of the housing 2 concentrates optical signals passing through the rear wall 2A of the housing 4 onto the end surface of the optical fiber 5.

The first lenses, 12a to 12d, have a focal length of 0.45 mm and the magnification of 5 to 6. The second lenses, 14a to 14d, have a focal length of 0.85 mm and the magnification thereof is unity (1). The third lens 4 has a focal length of 0.85 mm and the magnification of unity (1). Thus, the arrangement makes the second lenses, 14a to 14d, available for adjusting the optical power, where the arrangement including the second lenses, 14a to 14d, having relatively smaller magnification are set downward of the first lenses, 12a to 12d, that have the substantial magnification and are requested in respective positions with highest preciseness.

An optical module having the two lens system, which removes the first lens 12, requests the positional accuracy finer than 0.3 μm for a collimating lens. On the other hand, the transmitter optical module 1 of the present embodiment having the three-lens system may show performance comparable to those of an optical module having the two lens system only by setting the positional accuracy less than 1.5 μm for the second lens 14. In an optical components such as lenses are fixed by ultraviolet curable resin of epoxy system, such fixation by the resin is generally hard to secure the positional accuracy smaller than one (1) micron-meter.

Also, the transmitter optical module 1 sets the magnification of the first lenses, 12a to 12d, to be 5 to 6, which means that the second lenses, 14a to 14d, may decrease diameters of the field patterns of the collimated beams passing through the second lenses, 14a to 14d, to about 0.6 to 0.2 mm. Thus, the optical components constituting the optical system may narrow effective areas thereof.

Next, procedures to align the lenses will be described. First, placing the LDs, 11a to 11d, in respective positions in the housing 2, and carrying out the wire-bonding thereto, the electrical testing of the LDs, 11a to 11d, becomes possible. Then, as shown in FIG. 4A to FIG. 4D, alignment of the first lens 12 against the LD 11, determination of an initial position of the second lens 14 against the first lens 12, and alignment of the second lens 14 are sequentially performed. Next, respective steps will be described in detail.

Figure 4A:
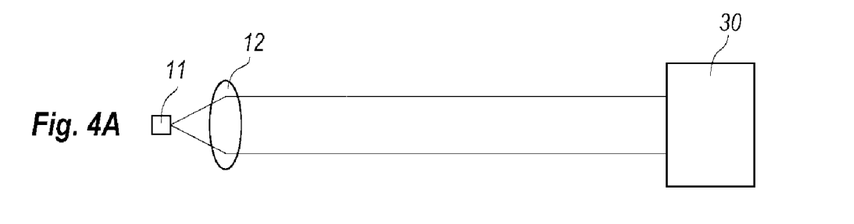
FIG. 4A to FIG. 4D explain optical alignments of a lens system implemented in the transmitter optical module shown in FIG. 1.

The position of the first lens 12 against the LD 11 may be first determined as shown in FIG. 4A. The determination is necessary to bring the optical signal output from the LD 11 out of the housing 2, where the LD 11 is set within the housing 2. A special tool may translate the optical signal output from the LD 11 out of the housing 2.

Setting an infrared camera 30 in a far point, typically 1000 mm apart from the housing 2, the first lens 12 may be positioned using the infrared camera 30. Specifically, bringing the optical signal output from the LD 11 out of the housing 2 so as to cross over the rear wall 2A by the special tool and monitoring a field pattern of thus extracted optical signal by the infrared camera 30, the position of the first lens 12 against the LD 11 may be determined so as to make the optical signal in a collimated beam.

At thus determined position of the first lens 12, the LD 11 in an output point thereof coincides with the focal point of the first lens 12, the optical beam passing the first lens 12 and reaching the infrared camera 30 becomes the collimated beam. Then, the first lens 12 is shifted from thus determined position. That is, the first lens 12 is offset so as to be apart from the LD 11 to attain the magnification of 5 to 6 between the LD 11 and the first lens 12.

Figure 4B:
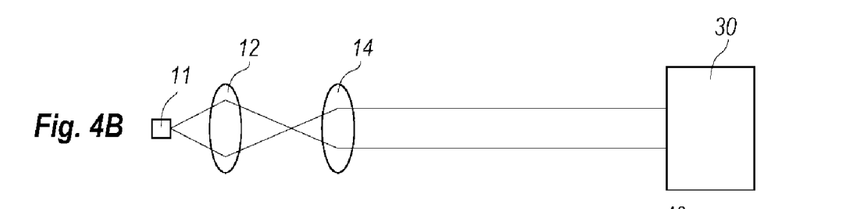

Next, as shown in FIG. 4B, the initial position of the second lens 14 against the first lens 12 is determined. This procedure also uses the infrared camera 30 set in the far point apart from the housing 2. Specifically, monitoring the field pattern detected by the infrared camera 30, the second lens 14 is positioned along the optical axis thereof such that the optical beam passing the second lens 14 and reaching the infrared camera 30 becomes a collimated beam.

Figure 4C:
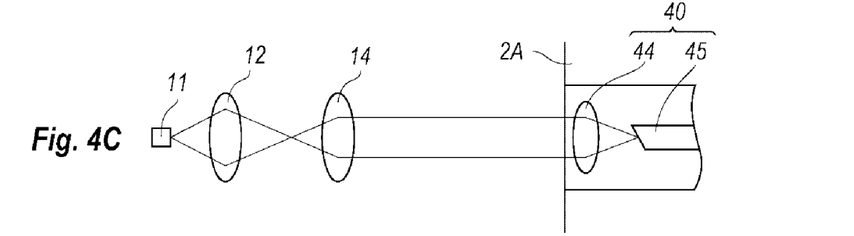

Then, as shown in FIG. 4C, the process sets a fixture 40 in a rear wall 2A of the housing 2. The fixture 40 provides a lens 44 and an optical fiber 45, where optical relations thereof emulate the optical relation between the third lens 4 and the optical fiber 5. That is, the lens 44 is arranged within the special tool such that the focal point thereof positions onto the end of the optical fiber 45.

Figure 4D:
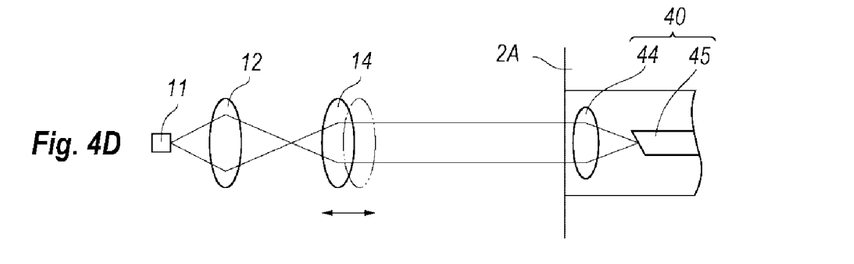

The fixture 40 is set at a position on the rear wall 2A at which the third lens 4 and the optical fiber 5 are arranged. The fixture 40 may be aligned with respect to the rear wall 2A. Thus, the collimated beam passing the second lens 14 is concentrated on the end of the optical fiber 45 by the lens 44. The fixture 40 is set at the position where an optical signal monitored through the optical fiber 45 shows maximum power. Then, the second lens 14 is aligned such that the optical signal detected through the optical fiber 45 shows designed power. Specifically, as shown in FIG. 4D, the process shifts the second lens 14a along the optical axis thereof such that the optical signal monitored through the optical fiber 45 becomes the designed power. Then, the second lens 14 is fixed thereat by adhesive resin. The explanation above concentrates on one combination of the LD 11, the first lens 12, and the second lens 14, among four combinations thereof. The process thus described may be equivalently applicable to all of four combinations.

After the alignment of one of the first lens 12 against the LD 11, that of the second lens 14 against the first lens 12, and that of the second lens 14; the alignment of rest channels are carried out. Note that the alignment of the rest channels leaves the alignment of the fixture 40, that is, the fixture 40 maintains the positional relation against the rear wall 2A during the alignment of the rest channels.

After the alignment of all first lenses, 12a to 12d, that of all second lenses, 14a to 14d, the fixture 40 is exchanged to the practical optical coupling portion 3 that provides the third lens 4 and the optical fiber 5, and the optical coupling portion 3 is fixed to the rear wall 2A after the alignment thereof against the rear wall 2A is carried out. Specifically, the third lens 4 is aligned in a plane perpendicular to the optical axis thereof by sliding the optical coupling portion 3 on the rear wall 2A, then, the stub 6 is aligned with respect to the third lens 4 within the plane. Iterating alignment of the third lens 4 and the stub 6 thus described, the optical coupling portion 3 is positioned at which the optical power detected through the optical fiber 5 becomes the maximum and fixed to the housing 2 by welding. Even when the optical power detected through the optical fiber 5 is a maximum, the absolute maximum thereof does not exceed the value restricted in the specification, because the second lenses, 14a to 14d, are independently aligned for the respective LDs, 11a to 11d.

The YAG-laser welding is applicable to the fixation by the welding. In the YAG-laser welding, the optical power of all of four lanes coupled with the optical fiber 5 may be set in the designed power by performing the three body alignment between the housing 2, the third lens 4 and the sleeve in the optical coupling portion 3 as maintaining the optical relation between the third lens 4 and the sleeve in the optical coupling portion 3 along the optical axis thereof.

Thus, the transmitter optical module 1 is assembled by the process including a step of aligning the second lenses, 14a to 14d, as shifting along the optical axes thereof. Thus, the second lenses, 14a to 14d, are independently aligned as cutting the alignment within the optical coupling portion 3; accordingly, the designed power for the optical signals output from the respective LDs, 11a to 11d, may be obtained.

Figure 5A:
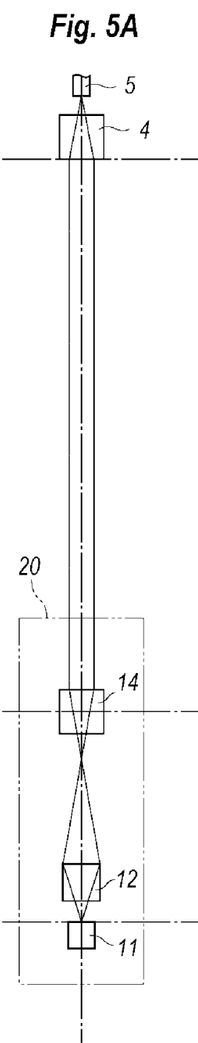
FIG. 5A to FIG. 5C show positional relations of an LD, a first lens, a second lens, a third lens, and an optical fiber.

In the step of aligning the second lens 14, the second lens 14 is sifted along the optical axis thereof in order to adjust the coupling power to the optical fiber 5 from a position where the second lens 14 in a focal point thereof in a side of the first lens 11 is coincide with the focal point of the first lens in a side of the second lens 14, which is shown in FIG. 5A. Two cases of the shift of the second lens 14 may be considered, that is, the second lens 14 is shifted closer to the third lens 4 or to the first lens 12 as shown in FIG. 5B and FIG. 5C.

When the second lens 14 is shifted closer to the first lens 12, the reflection at the surface of the second lens 14 increases. This reflection increases possibility for light returning the LD 11, which causes the optical output thereof to be instable or widens the spectral width.

Figure 5B:
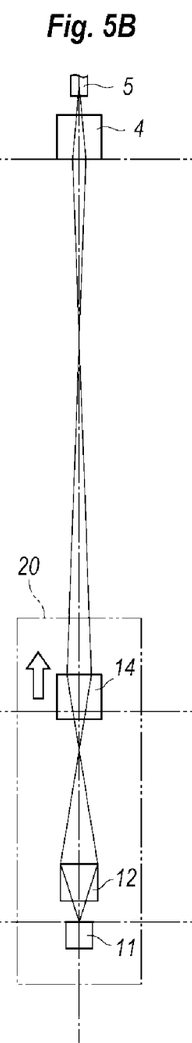
Figure 5C:
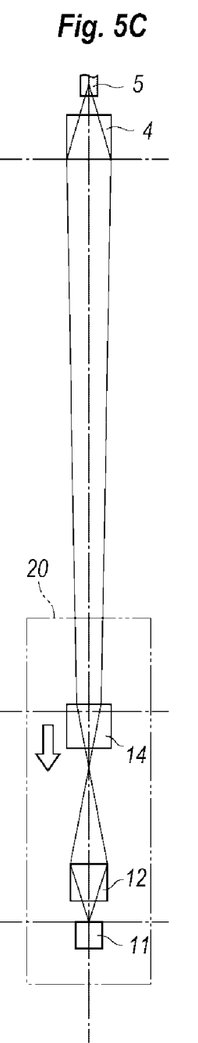
Figure 6A:
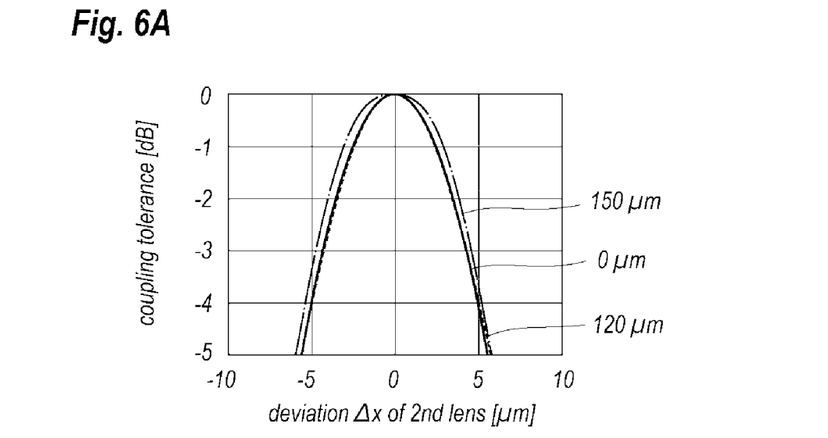
FIG. 6A and FIG. 6B show XY alignment tolerances of a sleeve, where FIG. 6A corresponds to a condition that the second lens is offset toward the LD, while FIG. 6B corresponds to a condition that the second lens is offset toward the optical fiber.
Figure 6B:
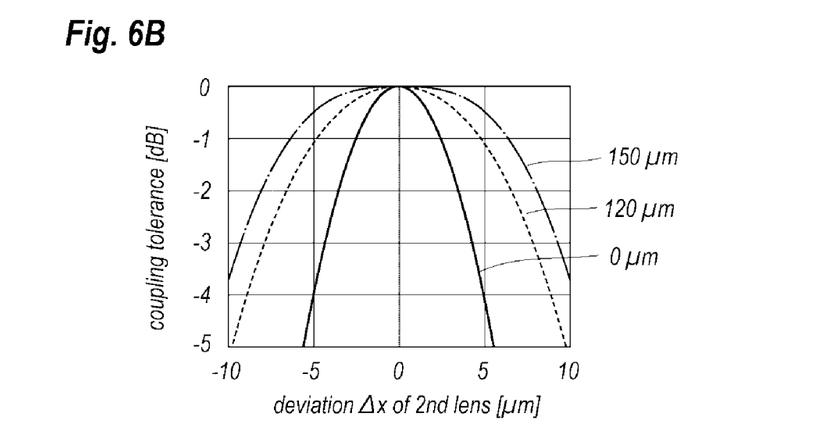

On the other hand, as shown in FIG. 5B and FIG. 6B, when the second lens 14 is shifted closer to the third lens 4, the coupling tolerance with the optical fiber 5 enhances compared with the other case where the second lens 14 is shifted closer to the first lens 12. FIG. 6A shows the coupling tolerance when the second lens 14 is shifted toward the first lens 12, while, FIG. 6B shows the coupling tolerance when the second lens 14 is shifted toward the third lens 4.

When the second lens 14 is shifted toward the third lens 4, the second lens 14 becomes the convergent coupling system. An optical signal passing this convergent coupling system, namely, concentrated by the second lens 14 and concentrated again by the third lens 4 shows a focal point thereof penetrating from the end of the optical fiber 5. That is, a distance from the third lens 4 to the focal point thereof is lengthened and the coupling tolerance is widened. Also, strengthening the shift amount of the second lens 14, not only the optical signal output from the first lens 12 and entering within an effective area of the second lens 14 decreases but also the optical signal output from the second lens 14 and entering an effective area of the third lens 4 also decreases, which considerably degrades the coupling efficiency. For instance, when the second lens 14 and the third lens 4 have focal lengths of 1.5 to 2.5 mm, which is relatively longer, the shift amount of the second lens 14 is limited to about 250 µm at most.

Figure 7:
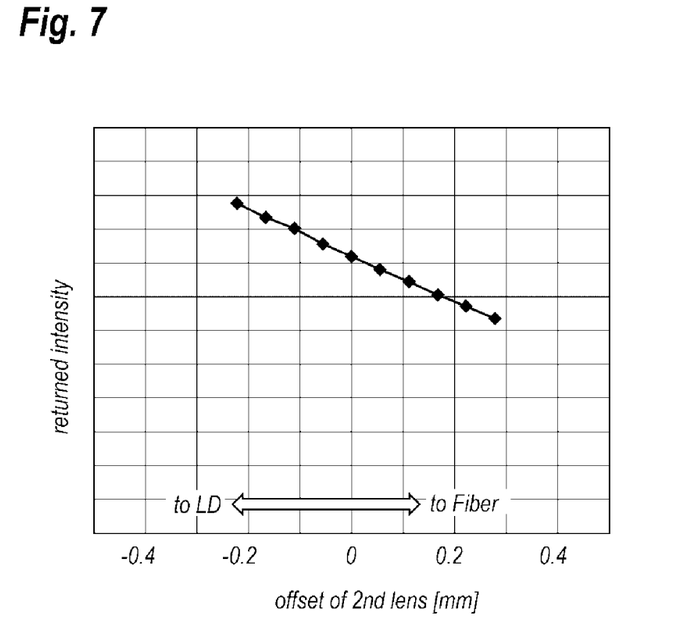
FIG. 7 shows a relation between backward light and a direction along which the second lens is offset.

Also, as shown in FIG. 7, when the second lens 14 is offset toward the third lens 4, the light reflected back to the LD 11 may be reduced compared with a case where the second lens 14 is offset toward the first lens 12. This is due to the reduction of the near surface reflection as increasing the distance between the first lens 12 and the second lens 14.

Second Embodiment

Figure 9:
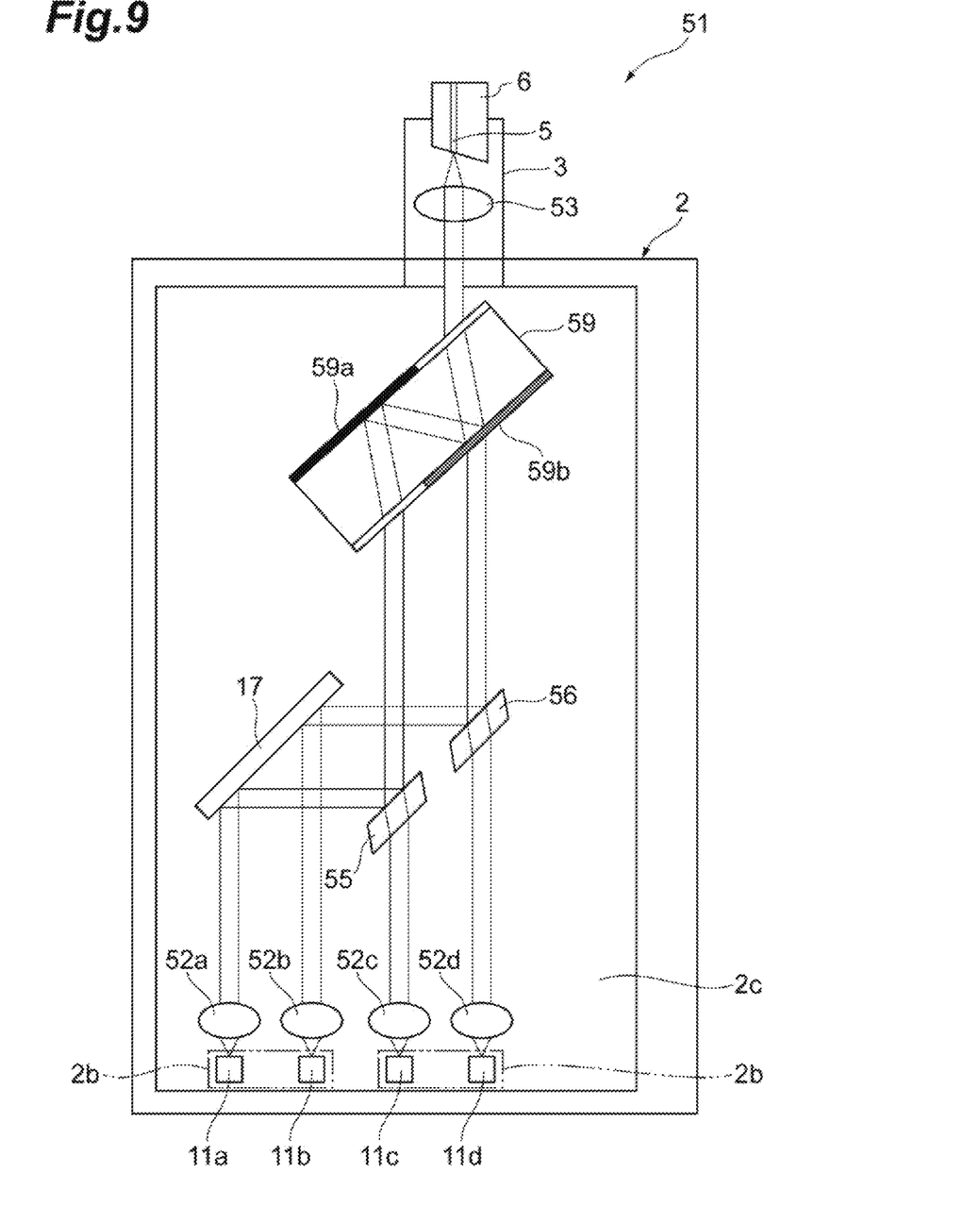
FIG. 9 schematically shows an optical coupling system according to the second embodiment of the present invention.

Next, another transmitter optical module 51 according to the second embodiment will be described. Explanations for elements duplicating the first embodiment will be omitted in the following description. As FIG. 9 illustrates, the transmitter optical module 51, which follows a standard of, for instance, CWDM4, has an optical system comprising two lenses. That is, the transmitter optical module 51 removes the first lenses, 12a to 12d, provided in the first embodiment.

The transmitter optical module 51 implements four LDs, 11a to 11d, four second lenses, 52a to 52d, first and second WDM filters, 56 and 57, the mirror 17, and a beam combiner 59. The beam combiner 59 provides a mirror film 59a and a half-mirror film 59b. The description below sometimes denotes the second lenses, 52a to 52d, as a second lens 52; that is, the second lens 52 indicates one of the lenses, 52a to 52d.

The LD 11 is mounted on carriers 2b in the housing 2, where the carriers 2b operate as transmission lines for high frequency signals and heat sinks. The LD 11 is arranged with a pitch of 0.75 mm, and one carrier 2b disposes two LDs 11 thereon from viewpoints of assemblage, inspection, and design of interconnections for high frequency signals. The carrier 2b is mounted on a base 2c having marks formed by gold (Au) metallization. The second lenses, 52a to 52d, correspond to the LDs, 11a to 11d. Optical signals output from the LDs, 11a to 11d, enter the second lenses, 52a to 52d, and they are converted into substantially collimated beams by the second lenses, 52a to 52d.

The optical signal output from the second lens 52a is reflected at the mirror 17 by 90°, reflected again by the first WDM filter 55, and multiplexed with another optical signal coming from the second lens 52c that transmits the first WDM filter 55. The optical signal output from the second lens 52b is reflected by the mirror 17 by 90°, reflected again by the second WDM filter 56 and multiplexed with the optical signal coming from the second lens 52d that transmits the second WDM filter 56. The optical signal multiplexed by the first WDM filter 55 is reflected by the mirror film 59a and multiplexed with the other optical signal coming from the second WDM filter 56 that transmits the half-mirror film 59b of the beam combiner 59.

The optical signal multiplexed by the beam combiner 59 may be externally output from the housing 2, and the optical signal output from the housing 2 optically couples with an end surface of the optical fiber 5, which is secured by the fiber stub 6, by the third lens 53 supported in the coupling member 3. The coupling member 3 disposes an optical isolator of a polarization dependent type just in front of the end surface of the optical fiber 5, and the polarization dependent optical isolator may be made in compact having a dimension of 0.45 mm.

Figure 10:
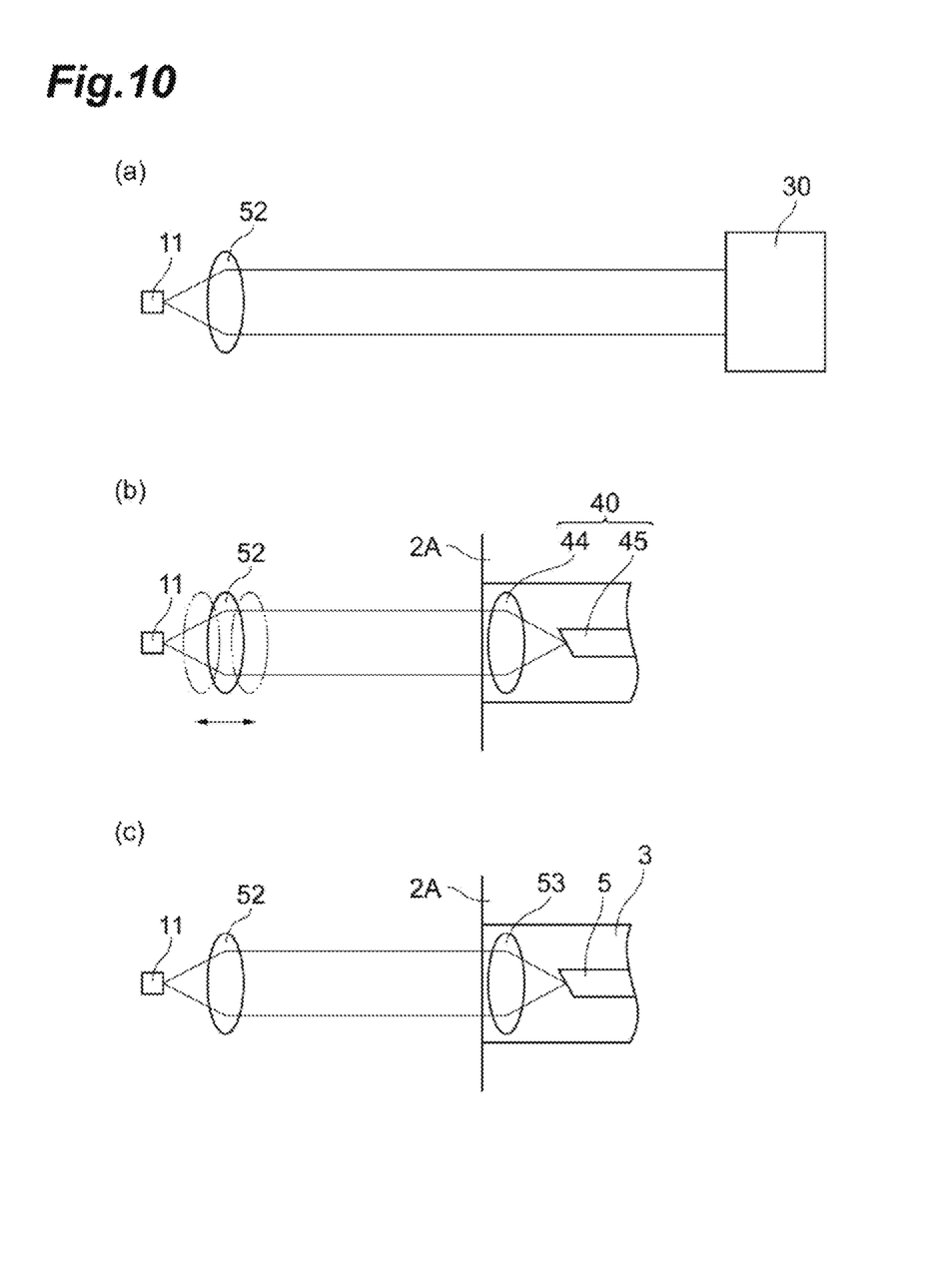
FIG. 10 explains an optical alignment of the lens system implement n the transmitter optical module shown in FIG. 9.

As shown in FIG. 9 and FIG. 10, the second embodiment may set the fiber coupling power of respective optical signals within a preset range by moving the second lenses, 52a to 52d, along the optical axes thereof. That is, the second lenses, 52a to 52d, are adjusted in the positions along the optical axes thereof until the fiber coupling power becomes within the preset range.

Next, processes to position the lens in the transmitter optical module 51 will be described. First, the process mounts the LDs, 11a to 11d, in respective preset positions; and carries out the wiring for the LDs, 11a to 11d, then, performs the alignment of the second lenses 52 against the LDs 11.

During the alignment, the optical signal output from the LD 11 is brought out of the housing 2. That is, the special tool may translate the axis of the optical signal out of the housing 2 parallel to the optical axis of the LD 11; then, the second lens 52 is positioned using an infrared camera 30 remotely disposed from the housing 2.

Specifically, as bringing the optical signal output from the second lens 52 out of the housing 2 and monitoring, by the infrared camera 30, a field pattern of the optical signal thus brought out, the position of the second lens 52 is first determined such that the optical signal output from the LD 11 becomes a collimated beam by the second lens 52. At that position of the second lens 52, an emitting point of the LD 11 coincides with the focal point of the second lens 52; accordingly, the optical signal output from the second lens 52 and reaching the infrared camera 30 becomes the collimated beam.

Next, similar to the first embodiment, the fixture 40 is set on the rear wall 2A of the housing 2 at which the optical signal detected through the optical fiber 45 becomes a maximum. Then, the second lens 52 is adjusted in the position along the optical axis thereof such that the power detected through the optical fiber 45 becomes a target power. Finally, the second lens 52 is fixed thereat by adhesive resin.

Thus, positioning the second lens 52 with respect to the LD 11 and aligning the second lens 52, rest of the second lens 52 in the positions thereof may be determined such that the power of the optical signals optically coupled with the optical fiber becomes the target power. Then, replacing the fixture 40 with the coupling member 3 as keeping a positional relation between the third lens 53 and the sleeve in the coupling member 3 along the optical axis, the coupling member 3 is fixed to the housing at a position where the power detected through the sleeve becomes the target power. Thus, all of four optical outputs coming from the second lenses, 52a to 52d, show the fiber coupling power adjusted in the designed one.

Thus, the transmitter optical module 51 may be assembled by the process including a step of aligning the second lenses, 52a to 52d, along the optical axes thereof. Aligning the second lenses, 52a to 52d, independently, the optical signals each output from the LDs, 11a to 11d, show the designed power.

Also, two directions may be considered along which the second lens 52 is moved, that is, the direction to move the second lens 52 closer to the third lens 53 and to the LD 11. When the second lens 52 is moved closer to the third lens, similar to the first embodiment, not only the coupling tolerance for the optical fiber 5 enhances but reduces light reflected thereby and returns the LD 11.

Thus, preferred embodiment according to the present invention is described. The present invention is not limited to those described embodiment. It could be easily understood for ordinary persons in the field that various modification and changes may be applicable within a scope of substance recited in claims. For instance, the embodiment described above concentrates on a multi-channel optical module providing a plural lanes including the LDs, 11a to 11d, the first lenses, 12a to 12d, and the second lenses, 14a to 14d; but, the invention is applicable to an optical module that provides a unique LD, a unique first lens, and a unique second lens.

Also, although the second embodiment described above provides the beam combiner 59 having the mirror film 59a and a half-mirror film 59b; a mirror and a half-mirror instead of the mirror film 59a and the half-mirror film 59b may be independently disposed.

The invention claimed is:

1. A multi-channel transmitter optical module generating a wavelength multiplexed signal that multiplexes optical signals having respective wavelength different from each other, the multi-channel optical module, comprising:
a plurality of signal lanes each generating one of the optical signals and including a transmitting optical device, wherein the transmitting optical device is a semiconductor laser diode (LD), a first lens, and a second lens, wherein
the first lens is disposed in a position where the one of the optical signals output from the LD is concentrated by the first lens, and
the second lens is disposed in a position where the one of the optical signals passing the first lens and concentrated by the first lens is concentrated again by the second lens;
an optical coupling system that generates the wavelength multiplexed signal by multiplexing the optical signals output from the signal lanes; and
a third lens disposed in a position where the optical signals passing the second lens and concentrated by the second lens in the respective signal lanes are concentrated again within a core of the optical fiber by the third lens.

2. The multi-channel transmitter optical module according to claim 1,
wherein, in the respective signal lanes,
the position of the first lens with respect to the LD is longer than a focal length of the first lens in a side of the LD, and
the position of the second lens with respect to a point where the optical signal passing the first lens is concentrated is longer than a focal length of the second lens in a side of the first lens; and
wherein the position of the third lens with respect to points where the optical signals passing the second lenses are concentrated in the respective signal lanes are longer than a focal length of the third lens in a side of the second lenses.

3. The multi-channel transmitter optical module according to claim 1,
wherein, in the respective signal lanes, the first lens has magnification greater than or equal to 5 but smaller than or equal to 6.

4. The multi-channel transmitter optical module according to claim 1, wherein the multi-channel transmitter optical module includes first to fourth signal lanes outputting first to fourth optical signals, respectively, and wherein the optical coupling system includes two wavelength division multiplexing (WDM) filters and a polarization composite filter, the WDM filters multiplexing the first optical signal with the second optical signal and the third optical signal with the fourth optical signal, respectively, the polarization composite filter outputting the wavelength multiplexed signal by multiplexing the first and second optical signals multiplexed by the one of the WDM filter with the third and fourth optical signals multiplexed by the another of the WDM filter and rotated in polarizations thereof by 90°.

* * * * *